United States Patent [19]
Sheahan

[11] 3,800,113
[45] Mar. 26, 1974

[54] PANEL MOUNTED BEZEL FOR ELECTRICAL SWITCHES

[75] Inventor: Robert E. Sheahan, Woodbridge, Conn.

[73] Assignee: J-B-T Instruments, Inc., New Haven, Conn.

[22] Filed: June 27, 1973

[21] Appl. No.: 373,929

[52] U.S. Cl. .............................. 200/295, 248/27
[51] Int. Cl. ............................................ G12b 9/10
[58] Field of Search ................... 200/168 C; 248/27; 339/128

[56] References Cited
UNITED STATES PATENTS

| | | | |
|---|---|---|---|
| 3,402,384 | 9/1968 | Murakami et al. | 339/128 |
| 3,213,189 | 10/1965 | Mitchell | 248/27 X |
| 3,168,612 | 2/1965 | Sorenson | 200/168 C X |
| 3,091,679 | 5/1963 | Norden | 339/128 |
| 2,703,662 | 3/1955 | Meyer | 248/27 X |

*Primary Examiner*—Robert K. Schaefer
*Assistant Examiner*—William J. Smith
*Attorney, Agent, or Firm*—H. Gibner Lehmann; K. Gibner Lehmann

[57] ABSTRACT

A bezel for mounting an electrical switch on a panel in a manner that the switch can be readily installed and removed from the front of the panel. The bezel comprises a substantially rectangular mounting flange having an opening to receive with clearance the operating member of the switch, and a pair of brackets integral with the flange and extending rearwardly at right angles to the plane thereof. Each bracket has two outer strips and also an inner strip interposed between and connected to the outer strips at a location removed from the junction of the bracket and the mounting flange. The outer strips have reverse bends which cause the brackets to be cammed inwardly when the bezel is inserted into the mounting hole of the panel. The inner strips also have reverse bends which enable free portions thereof to engage opposite edge portions of the panel hole. and further have notches to provide for a bending action by which the bezel is, in effect, virtually locked in place after its insertion. Means including a switch mounting plate are provided for securing the switch to the free ends of the brackets, thus providing a very flexible arrangement for repair or replacement of the switch, if ever required.

7 Claims, 11 Drawing Figures

PATENTED MAR 26 1974 3,800,113
SHEET 2 OF 2
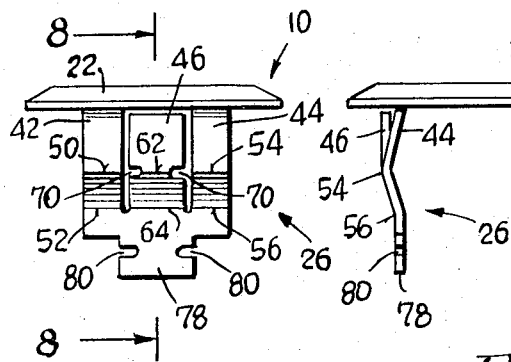
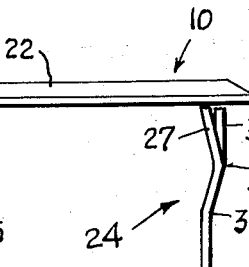
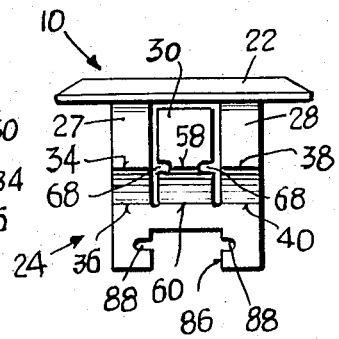
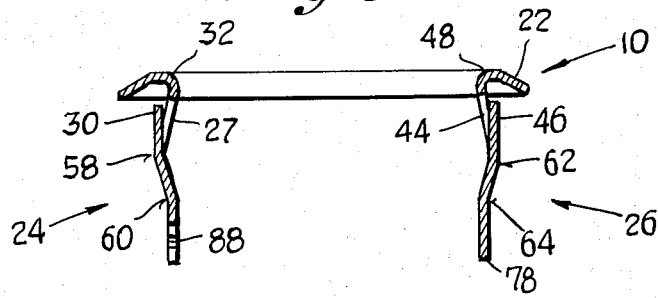
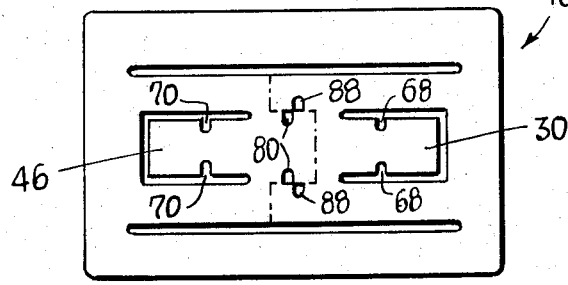
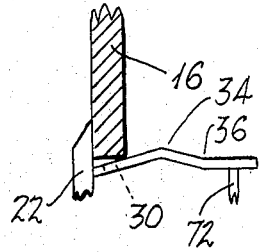
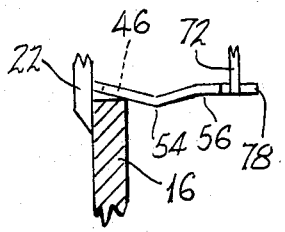
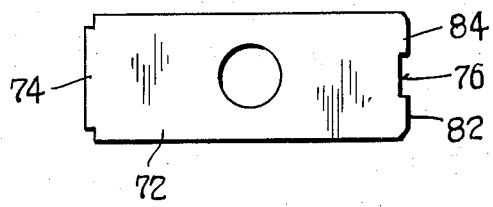

3,800,113

PANEL MOUNTED BEZEL FOR ELECTRICAL SWITCHES

BACKGROUND

This invention relates generally to mounting bezels or adapters for electrical switches, and more particularly to adapters which support an electrical switch behind a front panel, and which enable the switch to be readily installed and removed from in front of the panel. An adapter of this type is disclosed in U.S. Pat. No. 3,168,612, showing a pair of spaced-apart bezel flanges which have rearwardly extending brackets that include angularly-disposed spring leaf elements. The brackets each have sets or pairs of notches which receive lugs that are carried by the switch case. While this adapter is satisfactory in many respects, it has a number of disadvantages. The assembly of the switch case to the adapter is somewhat cumbersome because the four lugs carried by the switch case have to be aligned with and snapped into corresponding notches in the brackets. Due to the presence of so many notch pairs, this is often an awkward and time consuming procedure. In addition, the brackets are sloped somewhat with respect to the switch mounting plate and its lugs, as can be seen in FIG. 4 of the patent, which also makes assembly somewhat difficult. In addition, the ends of the leaf springs can conceivably become locked behind the panel if the latter is thin, thus defeating the removability feature of the switch mounting.

SUMMARY

The above drawbacks and disadvantages of prior switch mounting adapters are obviated by the present invention which has for an object the provision of a novel and improved switch bezel for mounting an electrical switch to a panel, which is especially simple in its construction, inexpensive to manufacture, and particularly easy to assemble and install. A related object is the provision of a switch bezel as above characterized which is virtually fool-proof and maintenance-free, and which essentially locks the switch to the panel yet permits it to be readily repaired or even replaced from in front of the panel which this latter becomes necessary.

The above objects are accomplished by a novel switch bezel construction comprising the combination of a rectangular mounting flange having a pair of integral, rearwardly extending mounting brackets disposed substantially at right angles to the plane of the flange, the brackets each including two outer strips and an inner strip interposed between and spaced apart from the outer strips. The outer strips are resilient, and each has two reverse bends which cause the brackets to cam inwardly when the bezel is inserted into a panel mounting hole. In addition, on each bracket the inner strip is attached to the outer strips at a location thereon removed from the junction of the brackets and the mounting flange. Each of the inner strips also has two reverse bends, so that the free ends thereof can frictionally engage edge portions of the aperture or mounting hole of the panel. The free ends of the inner strips are substantially parallel to one another and sufficiently long to preclude the likelihood of their slipping behind a thin panel and permanently locking the bezel against the rear surface thereof so as to prevent removal when desired of the bezel and switch. The above arrangement instead insures that the bezel and switch will never inadvertently work loose yet it can always be readily removed from the panel for inspection, or for maintenance such as repair or replacement of the switch.

Other features and advantages will hereinafter appear.

In the drawings, illustrating a preferred embodiment of the invention:

FIG. 5 is a side elevational view of the switch bezel per se.

FIG. 6 is a top plan view of the bezel per se.

FIG. 7 is a bottom plan view of the bezel per se.

FIG. 8 is a section taken on line 8—8 of FIG. 7.

FIG. 9 is a front elevational view of the switch bezel of FIGS. 5–8, during an intermediate stage of fabrication, showing a sheet metal blank which has been punched out, prior to the bending and forming of the mounting brackets.

FIG. 10 is a front elevational view of a switch mounting plate as employed with the bezel of the present invention.

FIG. 11 is a fragmentary right side elevational view similar, in part, to that of FIG. 4 but revealing a smaller panel opening in which the switch bezel is received.

Figure 1:
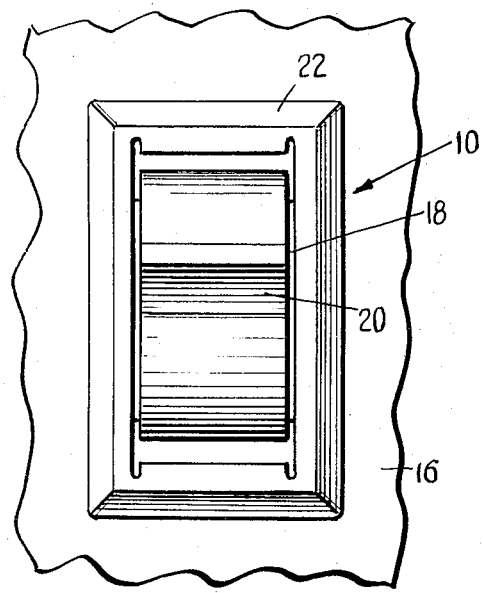
FIG. 1 is a front elevational view of the switch bezel of the present invention, shown carrying an electrical switch and being mounted on a panel.
Figure 4:
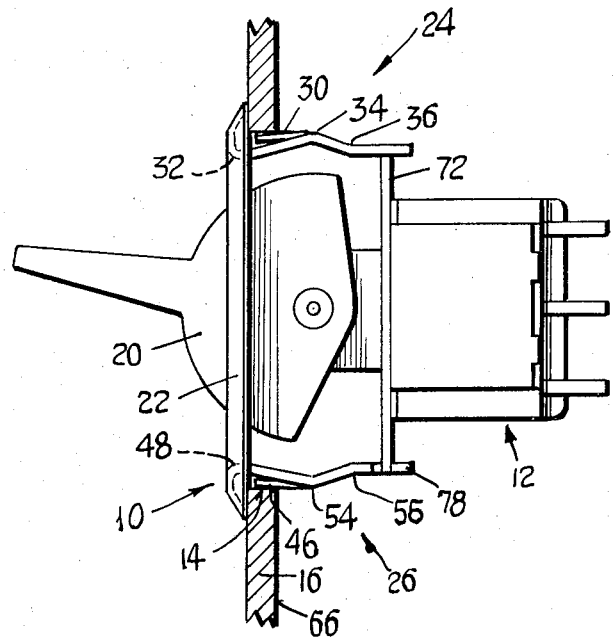
FIG. 4 is a right side elevational view of the bezel and switch of FIGS. 1–3.
Figure 2:
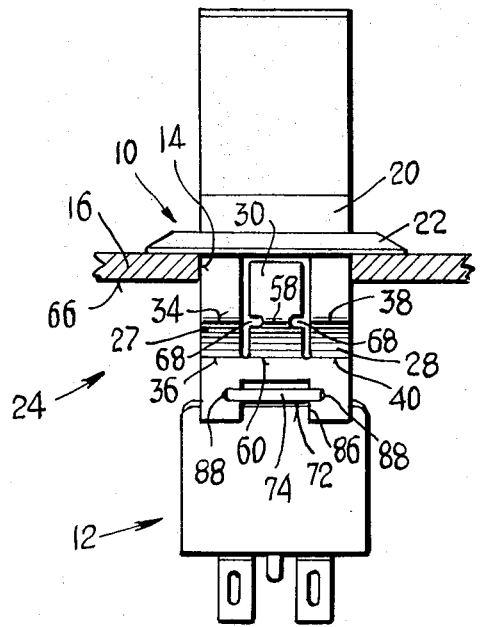
FIG. 2 is a top plan view of the panel mounted bezel and switch of FIG. 1.

Referring to FIGS. 1–4, there is illustrated a bezel construction generally designated by the numeral 10, arranged for securing an electrical switch 12 in an aperture 14 of a panel 16. The bezel has a substantially rectangular configuration with an opening 18 which receives an operating member 20 of the switch 12, such operating member protruding through the opening 18 as illustrated in FIG. 4. The bezel comprises a mounting flange 22 having a size larger than that of the opening 14 and being adapted to abut portions of one side of the panel adjacent the opening.

In accordance with the present invention and referring to FIGS. 1–8 there is provided a pair of unique brackets 24, 26 which are integral with the mounting flange 22 and which extend rearwardly therefrom, substantially at right angles to the plane thereof. The bracket 24 comprises two outer strips 27, 28 and an inner strip 30 (FIGS. 2, 6) connected to the outer strips at a point removed from the junction 32 of the bracket 24 and flange 22. As shown, the inner strip 30 is interposed between and spaced from the outer strips 27 and 28. The outer strips 27, 28 have two reverse bends 34, 36 and 38, 40 respectively, which cause the bracket 24 to be cammed inwardly as the bezel 10 is inserted into the panel hole 14. The bracket 24 is resilient and returns to the position shown in FIG. 4 when the insertion is completed.

Figure 3:
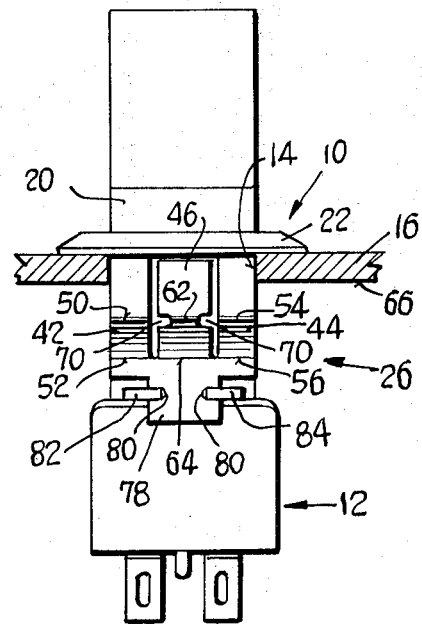
FIG. 3 is a bottom plan view of the bezel and switch of FIGS. 1 and 2.

Similarly, as illustrated in FIG. 3 the other bracket 26 which is also resilient, comprises two outer strips 42 and 44 and an inner strip 46 disposed between and spaced from the outer strips. The inner strip is connected to the outer strips at a point removed from the junction 48 of the bracket 26 and the mounting flange 22. The outer strips 42 and 44 are characterized by reverse bends 50, 52 and 54, 56, respectively. By such an arrangement, the bracket 26 is also cammed inwardly and toward the bracket 24 when the bezel is inserted into the mounting hole 14 of the panel.

Referring again to FIGS. 2 and 3 and in accordance with the present invention, each of the inner strips 30 and 46 is also characterized by two reverse bends 58, 60 and 62, 64 respectively. As best illustrated in FIG. 4, the free ends of the inner strips are disposed outside the adjacent portions of the respective bracket. Each of the inner strips is resilient and is normally biased or disposed outwardly as shown in FIG. 5. When the bezel is mounted in the panel, the inner strips are urged inwardly slightly by the edge 14, such that the strips apply pressure to and frictionally engage the opposite edge portions of the aperture and securely maintain the bezel and switch assembly in the position illustrated in FIG. 4. Under these conditions the strips 30, 46 are substantially parallel to one another as well as substantially perpendicular to the plane of the flange 22, or they can be slightly divergent toward the front, with bending occurring at notches designated below. It can be seen in FIG. 4 that the strips 30, 46 have sufficient length so as to pass forwardly of the rear surface 66 of the panel 16, and thus no permanent locking of the bezel occurs but rather there is a strong frictional engagement, particularly between the strips 30, 46 and the panel edge 14. The inner strips 30 and 46 have pairs of notches 68 and 70 respectively along opposite longitudinal edge portions adjacent the bends 58, 62. The notches facilitate slight bending of the strips mentioned above, as well as providing increased flexibility of the free ends with respect to the remaining portions thereof, and this is an important feature of the invention. The ability of the inner strips 30, 46 to bend slightly means that they can present forwardly-facing surfaces to the edges of the panel opening, as seen in FIG. 4, making for a more secure, locking-type retention.

Further in accordance with the present invention there are provided cooperable retainer means on the switch 12 and on the free ends of the brackets 24, 26 for securing the switch thereto, comprising a mounting plate 72 which carries the switch 12 and has at one end a protruding mounting tab 74 (FIG. 10) and at its other end a recessed portion 76. As illustrated in FIGS. 3 and 7, the free end of the bracket 26 terminates in a mounting tab 78 which has notches 80 along its opposite longitudinal edge portions. The notches 80 receive the portions 82, 84 (FIG. 10) of the plate 72 which define the recess 76. The other bracket 24 has a slot 86 and notches 88 (FIG. 6) which receive the protruding tab 74 of the plate 72. The assembly of the plate and switch carried thereby to the bezel is readily accomplished by first engaging an end of the plate 72 by the corresponding bracket, springing the resilient bracket outwardly slightly, and inserting the other end of the plate onto the free end of the other bracket. Since the brackets 24, 26 are both resilient and are formed so they can be slightly biased toward one another, the plate is firmly held in place, once the assembly is completed.

The above construction has a number of distinct advantages. The cost of manufacture of the bezel is very low, since the entire unit can be made as a single stamping. FIG. 9 illustrates a blank of sheet metal which has been stamped and punched, prior to the bending and forming of the brackets. As shown, there is virtually no waste of material except at the locations of the punched out areas. In addition, the assembly of the mounting plate and switch to the bezel is greatly simplified and requires no more than several seconds. Also, installation of the bezel in the panel is a simple procedure, and the bezel construction has the advantage that if necessary it can be easily removed by a strong pull, as when servicing or inspection of the switch is required.

In FIG. 4 the panel opening is sufficiently large to permit a certain degree of spreading apart of the center strips 30, 46. FIG. 11 illustrates a panel 16 having a smaller opening than that of FIG. 4; this has the effect of compressing to a greater extent the center strips 30, 46 whereby these are virtually aligned with their respective, adjoining outer strips. By such arrangement an extremely secure attachment of the bezel 22 is had to the panel 16 whereby a very considerable force must be exerted if the bezel is to be removed. A smaller panel opening as in FIG. 11 has the effect of securely locking the bezel and switch to the panel against vibration, dislodging forces, etc.

From the above it can be seen that I have provided a novel and improved switch mounting bezel which is especially economical to produce and practical to utilize.

The construction is virtually foolproof and requires no maintenance. The bezel thus represents a distinct advance and improvement in the technology of switch mounting adapters.

Variations and modifications are possible without departing from the spirit of the invention.

I claim:

1. A bezel construction for releasably securing an electrical switch in an aperture of a panel, comprising in combination:
   a. a substantially rectangular mounting flange adapted to abut one side of the panel,
   b. said flange having an opening to receive the operating member of the switch,
   c. a pair of brackets integral with said flange and extending rearwardly substantially at right angles to the plane thereof,
   d. said brackets each comprising two outer strips and an inner strip interposed between and spaced from the outer strips, said inner strip being connected to the outer strips at a point removed from the junction of the bracket and flange,
   e. each of said outer strips being characterized by a pair of reverse bends, adapted to cam the brackets inwardly toward one another when the bezel is either inserted in the aperture or removed therefrom,
   f. said reverse bends bowing the strips of one of the brackets in a direction away from the strips of the other bracket,
   g. cooperable retainer means on the switch and on the free ends of said brackets, for securing the switch thereto,
   h. said inner strips being resilient and extending toward said mounting flange, such that the free ends of each inner strip frictionally engages edge portions of the aperture when the bezel is mounted therein.

2. A bezel construction as in claim 1, wherein:
   a. each of said inner strips has reverse bends, such that the free ends extend in directions away from one another to thereby apply pressure against and to frictionally engage opposite edge portions of the aperture.

3. A bezel construction as in claim 2, wherein:
a. each of said inner strips has a pair of notches along the opposite longitudinal edge portions thereof,
b. said notches of each strip being disposed adjacent the location of one of the reverse bends therein, thus enabling the free ends of the inner strips to undergo limited flexing movement with respect to the remaining portions thereof.

4. A bezel construction as in claim 1, wherein:
a. said cooperable retainer means comprises a mounting plate carried by the switch,
b. said plate having at one end a protruding mounting tab, and having at another end a recessed portion,
c. the free end of one of said brackets having a slot for releasably receiving said mounting tab,
d. the free end of the other one of said brackets having a tab receivable in said recessed portion,
e. said brackets being spring biased into engagement with the ends of the mounting plate to thereby hold captive the latter and the switch carried thereby.

5. A bezel construction as in claim 4, wherein:
a. said bracket tab has a pair of oppositely disposed notches adapted to receive portions of the switch mounting plate, which define the recess thereof.

6. A bezel construction as in claim 4, wherein:
a. the edges of the slot in said one bracket have notches to receive the protruding mounting tab of the switch mounting plate.

7. A bezel construction as in claim 1, wherein:
a. each inner strip is substantially co-planar with its associated outer strips when the flange is disposed in the panel aperture.

* * * * *